Jan. 31, 1961  M. GOGOL  2,969,622
MEANS FOR REPRODUCTION OF MASTER SHAPES
Filed Nov. 25, 1957  3 Sheets-Sheet 2
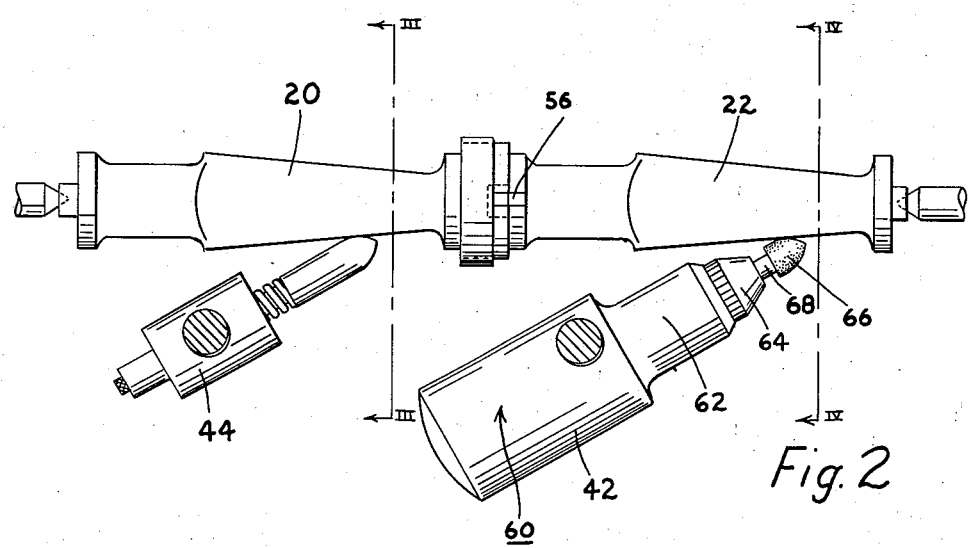
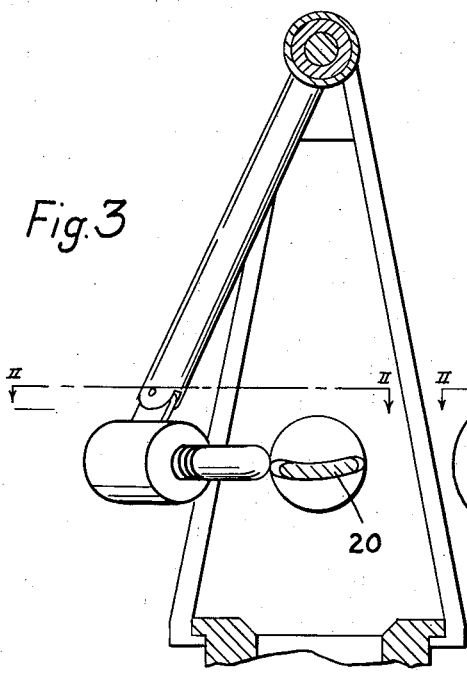
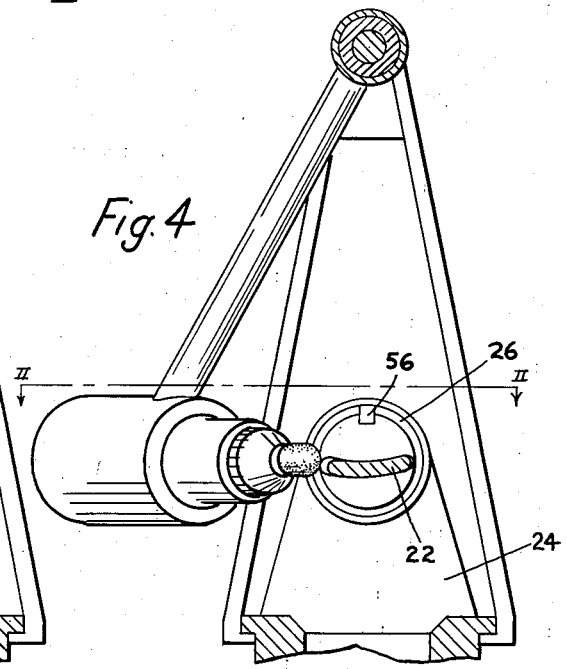
MITCHELL GOGOL
*INVENTOR.*
BY Robert Wright Jan. 31, 1961 M. GOGOL 2,969,622
MEANS FOR REPRODUCTION OF MASTER SHAPES
Filed Nov. 25, 1957 3 Sheets-Sheet 3

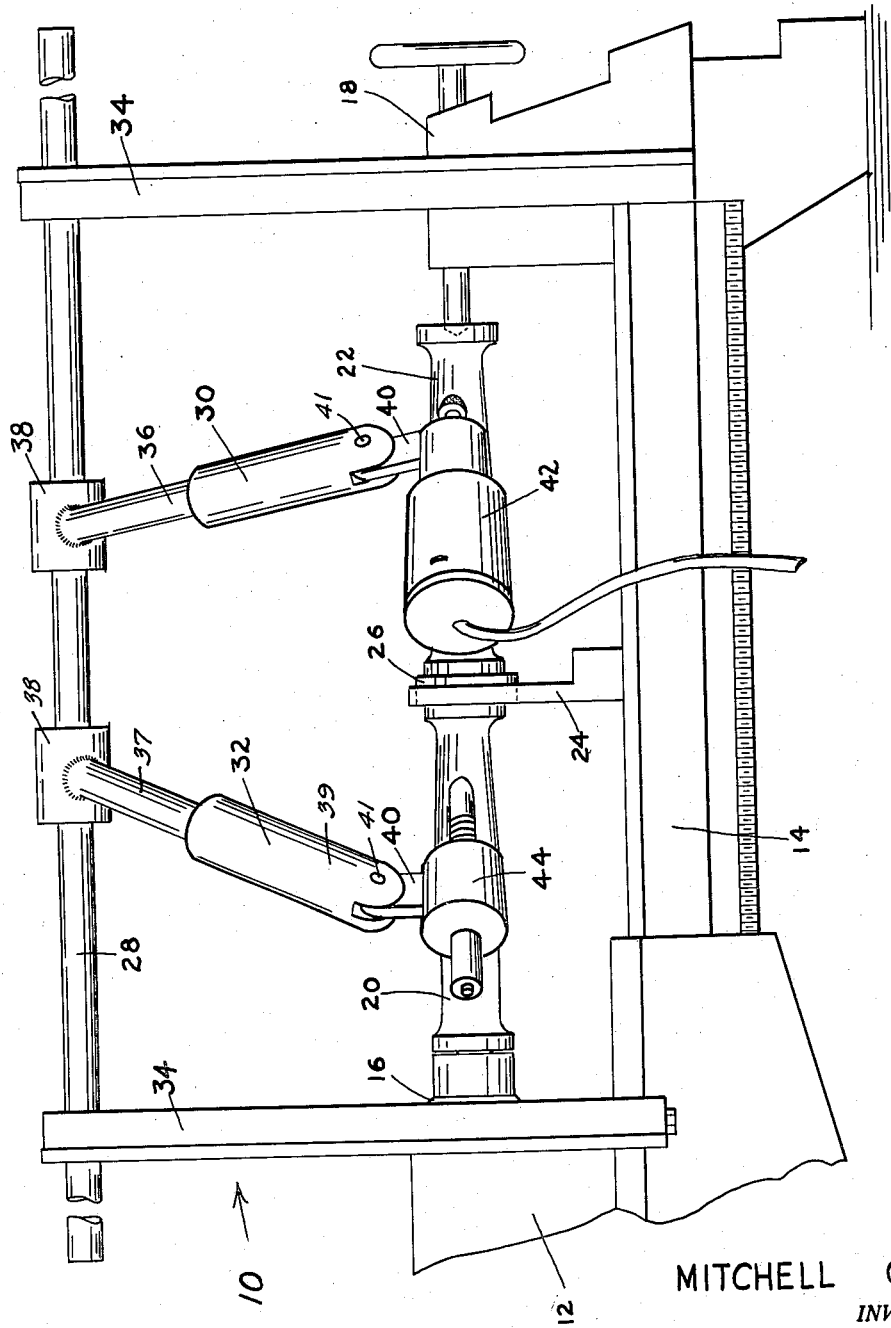

MITCHELL GOGOL
*INVENTOR.*

BY Robert O. Wright

United States Patent Office 2,969,622
Patented Jan. 31, 1961

2,969,622

MEANS FOR REPRODUCTION OF MASTER SHAPES

Mitchell Gogol, 6 Janet Terrace, New Hartford, N.Y.

Filed Nov. 25, 1957, Ser. No. 698,593

8 Claims. (Cl. 51—101)

This invention relates to a machine for grinding or cutting duplicate parts from a master and more particularly to an air foil grinding machine for exactly duplicating master airfoil cams and jet engine blades.

In the manufacture of jet engine turbine blades and similar articles it has been the custom to manufacture them by grinding roughly cast or formed blanks with a belt type grinder controlled by a master cam and cam follower arrangement. This arrangement has worked satisfactorily for certain applications particularly where the tolerances are not overly tight and critical. However, where very close tolerances are required it has been necessary to form special master cams that will compensate for errors in the machinery used and which must be carefully hand finished to the exact dimension required. This obviously has been time-consuming and costly since it requires a special form master cam for each different machine used and since each master cam does wear with use it is a costly and expensive process to keep the machines furnished with the proper master cams. Furthermore, true copies are not made of the master cam and hence it is more difficult to check the accuracy of the operation without special testing equipment.

According to the present invention I have discovered a machine for making exact duplicate copies of master cams wherein the resultant article can be used as a further master cam or as the production item in the airfoil for use in the jet engine turbine. I have accomplished this by precisely aligning the master and work cams relative to each other and to the grinding mechanism and the cam follower mechanism all in a manner that is simple and economical to manufacture and rugged and reliable in operation.

Accordingly it is an object of the present invention to provide a complicated shape reproducing machine that is simple and economical to manufacture, use and operate. It is another object of the present invention to provide an improved cam grinding machine for exactly duplicating a master cam. It is another object of the present invention to provide a grinding and cutting machine for exactly duplicating complicated shapes such as turbine airfoil blades. It is a still further object of the present invention to provide for grinding cams to the exact shape of a master guiding cam with a simple, inexpensive machine. It is a still further object of the present invention to provide a machine for exactly copying master shapes of cams, airfoils and the like in which the mechanism is inherently free of distorting stresses ensuring accurate alignment with minimum size machine members. It is another object of the present invention to provide a device that ensures greatly increased grinder material life without decrease in accuracy of grinding tolerance. It is another object of the present device to provide a grinding mechanism that permits easy maintenance of grinding accuracy regardless of wear on the grinding head itself. It is a still further object of the present invention to provide a machine for accurately grinding airfoil blades and cams to the exact image of a master which utilizes essentially standard equipment with minimum specialized attachments. These and other and further objects will be in part apparent and in part pointed out as the specification proceeds.

In the drawings:

Figure 1 is a side elevation of a machine according to my present invention;

Figure 2 is a partial sectional view of the machine of Figure 1 taken on line II—II of Figures 3 and 4;

Figure 3 is a section on line III—III of Figure 2;

Figure 4 is a sectional view on line IV—IV of Figure 2;

Figure 5:
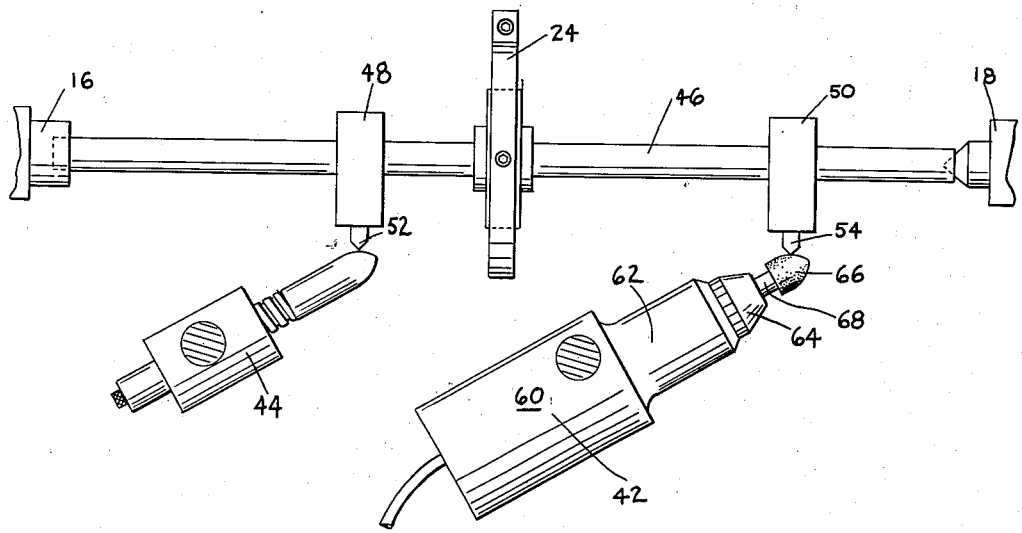
Figure 5 is a view similar to Figure 2 of the machine according to the present invention in the tool dressing position.

Referring now to Figure 1 the cam grinding machine 10 according to the present invention comprises generally a lathe portion 12 which is of a generally conventional type including a bed 14, headstock 16 and tailstock 18. The master cam 20 and the work cam or airfoil 22 are mounted in axial alignment between the headstock 16 and tailstock 18 in lathe 12. A central support member 24 is provided at the juncture of the two cams to ensure proper alignment thereof relative to the bed and axis of the lathe 12. The adjacent ends of the master cam 20 and work piece 22 are carried in a guide and timing assembly 26 which rides within the rest 24 and ensures the proper alignment of the respective cams and maintenance of them on the desired common center line.

Mounted axially parallel to the center line of the head and tail stocks of lathe 12 is a shaft 28 which has fixed thereon the grinding head assembly 30 and cam follower assembly 32. The shaft 28 is rotatably mounted in suitable bearings in A frames 34 or other suitable members which position the shaft 28 parallel to the axis of the lathe 12 and generally above it although not necessarily in the same vertical plane with the center line of the lathe proper. Both grinder and follower assemblies 30 and 32 comprise telescoping arms 36 mounted on sleeves 38 which are fixed to shaft 28 by set screws (not shown) at the desired spaced intervals. Telescoping arms 36 carry at the other end, in an adjustable yoke arrangement, mounting lugs 40 which have mounted thereon the grinder 42 and cam follower 44 respectively.

Grinder 42 is illustratively shown as a self-powered high-speed rotary grinder and the cam follower 44 as a rotatable stylus, adjustable as will be described in detail herein, carrying thereon a tip of generally the same shape as the grinder tip. As may be clearly seen in Figure 2 both the grinder 42 and the cam follower 44 are carefully mounted in parallel axial alignment so as to present identical tip contact elements to the work and master cams respectively. In the illustrative embodiment shown in Figures 1 and 2 the grinder 42 and the cam follower 44 are presented to the work and master cams respectively at approximately an angle of 30°. This angle obviously will vary depending upon the configuration of the cam surfaces to be ground or cut but generally varies somewhere between 20° and 45°.

As may be seen in Figure 5 the tool dressing assembly comprises a shaft 46 carried between headstock 16 and tailstock 18 of lathe 12 in identical axial alignment with the axis of cams 20 and 22 and supported by mid-support 24 as are the cams in Figure 1. Mounted on shaft 46 are tool holders 48 and 50 which carry therein a carbide stylus 52 and diamond cutter 54 of identical configuration and alignment. Tools 52 and 54 are preferably in the same horizontal plane as the axis of the shaft 46 and perpendicular thereto to present identical contact elements to the cam follower 44 and the tip of cam grinder 42.

Referring now in detail to Figures 1 through 4 it will be seen that the master cam 20 and the work piece 22 are of identical length and have corresponding cross-sections at corresponding distances from the end plate thereof. Also it can be seen from Figure 2 that the master cam 20 and the work piece 22 are accurately and precisely aligned along the axis of lathe 12 by the head and tail stocks and guide piece 24. Also the master cam and work piece are maintained in the proper phase or radial relationship by a key 56 placed in a key-way accurately machined in guide 26 and in the end plates of the cams. The whole assembly is then placed in the lathe for rotation in the usual manner therein with the guide 26 being free to rotate within support 24 while maintaining accurate alignment. A very accurate and precisely controlled base line is thus established for the remainder of the apparatus and the method of grinding of the work piece.

Shaft 28 is rotatably and slidably mounted within suitable bearings fixed in the A-frames 34 as may perhaps be seen better in Figures 3 and 4 and is operatively connected to any known feed means for moving said shaft and the parts supported thereon longitudinally of the lathe 12. Thus when it is desired to advance the grinder head 42 and cam follower 44 along the master cam and work piece, shaft 28 is positioned to the desired point and then the feed means is engaged to transport shaft 28 and hence grinder 42 and cam follower 44 longitudinally along the cam 20 and work piece 22.

Telescoping arms 36 are disposed angularly relative to each other so that there will be minimum stress and torque thereon and so that the grinder head and cam follower head will be presented to their respective cams as nearly as possible in a radial fashion relative to the axis thereof. The arms 36 comprise rod portions 37 fixed to sleeves 38 at one end and slidably mounted within telescoping sleeves 39 at the other end. Any suitable tightening arrangement for fixing the rods 37 relative to the sleeves 39 such as set screws or tapered wedge screws or the like may be used. (These means are omitted in the drawings for the sake of simplicity.) As may be seen in Figure 1 the mounting lugs 40 are fixed to the grinder assembly 42 and cam follower 44 and are pivotally mounted about pins 41 in the ends of sleeves 39. The pins 41 comprise a screw threaded into one side of the sleeve 39 so that on tightening it will clamp the lug 40 in the desired position. Thus, by movement of sleeves 38 relative to shaft 28, by adjusting the effective length of the arms 36 through the telescoping feature, just described, and by adjusting the position of the lugs 40 relative to the arms 36 the desired alignment of the grinder head 42 and cam follower 44 relative to the work piece and master cam may be obtained.

As may be seen in Figures 2 and 5 the grinder head 42 comprises generally a motor 60, a suitable gear box 62, a chuck 64 and a generally cylindrical grinding wheel 66 mounted or integrally formed on a shaft 68 inserted in chuck 64. Obviously while as shown the grinding head 66 is powered by an independent electrical motor it could be powered by belt or other means from a prime power source that also powers the lathe. Advantageously the grinding head 66 is arranged to rotate at a speed of approximately 45,000 r.p.m. although other similar speeds may be satisfactory.

Figure 6:
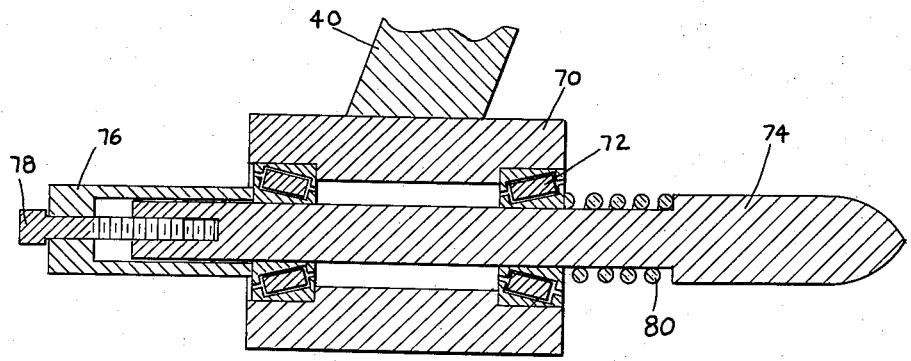
Figure 6 is a detailed sectional view of the cam follower mechanism of the present invention.

The cam follower head 44 (Figures 2 and 6) comprises a generally similar configuration including a body member 70 which carries therein tapered roller bearings 72, a cylindrical stylus 74 which has a generally conical nose portion for contact with the master cam and which carries about the other end a collar 76 and has threaded therein adjustment screw 78 which in cooperation with spring 80 permits longitudinal movement of the stylus 74 relative to the body 70.

As may be clearly seen in Figures 2 and 5 both the grinder wheel 66 and stylus 74 have identical conically shaped tips and they are purposely chosen to have identical diameters and radii of curvature so that identical contact will be maintained between the master cam 20 and the work piece 22 as grinding thereof is accomplished.

To maintain the identical configuration of the grinding head 66 and the stylus 74 a dressing fixture is provided as shown in Figure 5. In the illustrative embodiment shown the shaft 46 is inserted in the lathe after removal of the master cam 20 and work piece 22 and positioned therein in fixed condition. The tool holders 48 and 50 are spaced apart a distance exactly equal to the distance between corresponding sections on the master cam 20 and work piece 22 of Figure 1 (taking into account guide assembly 26) and carry therein the carbide stylus tip 52 and diamond cutting tip 54 of identical configurations. By retracting the stylus 74 a small amount (by tightening up on screw 78) and moving shaft 28 longitudinally within the A-frames 34 back and forth the diamond dressing bit 54 is caused to move over the tip 66 in exact conformity with the shape of the stylus tip 74 to reproduce the exact shape for the next cut on the work piece. The tool thus properly dressed is then reapplied to the master cam and work piece 20 and 22 reinserted in the lathe as shown in Figure 1. One or more cuts may be taken on the work piece depending upon the materials in the cams and grinding wheel so that the dressing operation may be performed after each pass or only after several passes.

For applications where it is desired to use a master cam that has an overall oversize or undersize envelope, the carbide stylus tip 52 may be moved axially in or out relative to diamond bit 54. For example, if the master cam is .020 larger in radius than the desired work piece radius, in order to finish it at precisely the same shape it is necessary to have the grinding wheel dressed .040 larger in diameter on the cutting area. This can be done by feeding the carbide stylus 52 "out" .020 further than the diamond, and results in the wheel 66 being dressed at precisely the same difference in size to the rolling stylus 74 as the work is to the master cam.

In actual operation of the machine as the grinding head 42 and cam follower 44 are moved along the cams 20 and 22 by conventional feed means, the stylus 74 moves in and out around the airfoil as may be seen in Figure 3 and causes the grinder wheel 66 to move in an identical fashion to reproduce the shape of the master cam 20 on the work piece 22 as shown in Figure 4. In other words, by simultaneously rotating the master cam 20 and the work piece 22 in synchronism and by moving the grinder head 42 and stylus 44 longitudinally therealong while rotating the grinding wheel 66 at very high speed and maintaining the stylus 74 and grinding head 66 in full congruent relationship to the cams 20 and 22 the identical configuration of master cam 20 is reproduced on the work piece 22.

It has been found that in actual use with the alignment shown the natural weight of the elements of the structure described is sufficient to cause the grinding wheel 66 to take off the necessary excess stock from the work piece 22 as it is rotated in the lathe. It has also been found that with the high speed of rotation of the grinding wheel 66 the grinder essentially grinds itself "free" before any distorting stresses can be set up.

As an illustrative example of the accuracy that can be obtained with the present machine, it has been found that on complex shapes wherein the best that previous machines could do was between five and twenty thousandths, I can, with the present machine, duplicate the master cam to within five ten-thousandths of an inch, and on simple shapes where the best previous results were between three and four thousandths, I can now come to within less than five ten-thousandths of an inch.

While as described above in connection with Figure 5 the grinding head 66 is normally made identical with the stylus 52 for certain operations where it is desirable to reproduce the exact same airfoil but to have the overall envelope dimensions either larger or smaller the diameter of the cylinder from which the stylus 74 is formed or from which the cutting head 66 is formed may be varied to produce the desired variation in overall envelope. For instance, if the diameter of the stylus 74 is increased but the radius of curvature is maintained identical, an identical airfoil shape will be produced having a larger overall envelope configuration. One way of effectively doing this is by moving carbide tip 52 as described above.

While the foregoing has described a specific configuration to accomplish the identical reproduction of a master cam it should be understood that other mechanical configurations could produce the same result as long as they are based upon the basic principles of the present method, namely the accurate alignment of the relative axes of the workpiece and cutting heads and cam follower and the accurate radial and parallel alignment of the cutting head and cam follower and the precise maintenance of identical radii of curvature on the cam follower stylus and grinder wheel head. Also by providing a configuration wherein the tools can be repeatedly dressed to the exact dimension required variations due to wear of the cutting tool are for all practical purposes eliminated.

In the foregoing illustrative embodiments I have described and shown my present invention applied to a cam grinder for duplicating master cams from a single master. It should be apparent that the same principles would apply equally to a cam cutting or milling machine for actually cutting production airfoil blades from stock.

I claim:

1. A cam grinding machine for accuratey duplicating the outer contour of a master cam on a work piece comprising a lathe having a distance between centers greater than the combined length of said master cam and work piece, a guide and timing assembly mounted approximately midway between said lathe centers and adapted to receive therein one end each of said master cam and work piece, a cam grinder assembly, a cam follower assembly, a shaft member slidably and rotatably mounted vertically above and in axial alignment with the axis of said lathe, a pair of angularly disposed arm members fixed to said shaft for rotary and longitudinal movement therewith, one of said arms carrying on the end there of said cam grinder assembly and the other of said arms carrying at the end thereof said cam follower assembly, adjustable telescoping and pivoting means on each arm member for adjustably securing said cam grinder and cam follower assemblies in parallel axial alignment in the same radial plane relative to said master cam and work piece, said grinder and cam follower assemblies being spaced apart such that the work piece and master cam contacting tip portions thereof are spaced apart a distance exactly equal to the distance between corresponding sections of said master cam and work piece, a second shaft member adapted to be inserted between the centers of said lathe and carrying thereon in parallel axial alignment a carbide stylus member and a diamond dressing stylus member, said carbide and diamond dressing stylii being spaced apart a distance exactly equal to the spacing of said cam grinder and cam follower assembly tips and means for positioning said second shaft member in said lathe in axial alignment with the axis thereof and with said dressing stylii in the same radial plane thereof with said cam grinder assembly and cam follower assembly, whereby upon dressing said cam grinder assembly tip portions periodically the shape of said master cam can be duplicated exactly on said work piece.

2. A device as described in claim 1 wherein said cam grinder assembly comprises a small high speed electrical motor and chuck assembly mounted on the end of said adjustable arm member and a conically shaped grinder wheel mounted in said chuck.

3. A device as described in claim 2 wherein said cam follower stylus head assembly comprises a yoke assembly mounted on the free end of said other adjustable arm member, a shaft member having a conical stylus tip rotatably mounted within said yoke member, spring means urging said stylus tip toward the master cam and a threaded screw member for adjustably withdrawing said stylus from said master cam.

4. A cam grinding machine for accurately duplicating the outer contour of a master cam on a work piece comprising a lathe mechanism adapted to receive between the centers thereof said master cam and work piece in end-to-end axial and radial alignment, a guiding and timing assembly adapted to receive and support the midpoint of said cam and work pieces in correct axial alignment relative to said lathe mechanism, a cam grinder assembly including a conically shaped grinding wheel adapted to contact the work piece, a cam follower assembly including a conically shaped stylus adapted to contact the master cam, said grinding wheel and stylus being of identical shape and dimensions at the contacting face portions thereof, a first shaft member rotatably mounted in a pair of arbors vertically above and parallel to the axis of said lathe mechanism, a pair of adjustable arm members fixed to said shaft and extending downwardly adjacent to the lathe mechanism, mounting means on the free ends of said arm members adapted to receive therein respectively said cam grinder and cam follower assemblies, said mounting means together with said adjustable arm members being positioned so as to align said grinding wheel and stylus in parallel axial alignment in a common radial plane of said master cam and work piece, said grinding wheel and stylus axes being spaced apart a distance exactly equal to the distance between corresponding portions of said master cam and work piece and a tool dressing assembly comprising a shaft member carrying thereon a cam follower contacting stylus and a grinder wheel dressing stylus spaced apart a distance equal to the spacing of said grinder wheel and follower stylus and means for selectively engaging said tool dressing assembly and said cam grinder and cam follower assemblies whereby said grinding wheel may be maintained in the exact shaft of said stylus after each cutting operation.

5. A duplicating machine for accurately copying the outer contour of a master cam on a work piece comprising in combination, support means for supporting a master cam and a work piece in end-to-end axial and radial alignment, means for rotating said master cam and work piece about the axis thereof, a material removing head assembly including a work piece contacting grinder wheel, a cam follower assembly including a master cam contacting stylus, mounting means for said material removing assembly and said cam follower assembly, said mounting means being positioned relative to said support means to present said grinder wheel and cam stylus to said work piece and master cam respectively in exact axial alignment but spaced apart a distance exactly equal to the distance between corresponding sections of said work piece and master cam, a tool dressing assembly including a grinder wheel dressing stylus and a master cam contacting stylus disposed in axial and radial alignment and spaced apart a distance exactly equal to the distance between corresponding sections of said work piece and master cam and means for selectively engaging said tool dressing assembly with said material removing and cam follower assemblies in an attitude corresponding to the presentation of said work piece and master cam.

6. A shape and contour duplicating machine comprising in combination supporting means for positioning a master cam and a work piece in end-to-end axial and radial alignment, means for rotating said master cam and work piece about the axis thereof, a cam follower assembly including a rotatable stylus member adapted to contact said master cam, a work piece grinding assembly including a grinding wheel formed in the duplicate shape of said stylus and a high speed lightweight electrical motor connected to said grinding wheel, mounting means for said cam follower and work piece grinding wheel assemblies adapted to permit rotary and longitudinal movement of said assemblies relative to said master cam and work piece, said mounting means being positioned so as to axially align said follower and grinding assemblies in a plane common with the axis of said work piece and master cam, means for presenting said grinding wheel to said work piece whereby said grinding wheel will grind itself "free" before distorting stresses are set up in said mounting means, and a tool dressing assembly positioned for selective engagement with said grinding wheel and stylus whereby said grinding wheel may be maintained in the exact shape of said stylus.

7. A device as described in claim 6 wherein said tool dressing assembly comprises a tool cutter stylus and a cam follower stylus disposed in axial alignment in a common plane and spaced apart a distance exactly equal to the distance between corresponding sections of said master cam and work piece and means for axially adjusting said cam follower contacting stylus.

8. A cam grinding machine for accurately duplicating the outer contour of a master cam on a work piece comprising lathe and support means for positioning a master cam and a work piece in end-to-end axial and radial alignment, means for rotating said cam and work piece about the axis thereof, a cam grinder head, a cam follower stylus, a shaft member mounted in axial alignment with the axis of said cam and work piece for rotary and longitudinal movement relative thereto, a pair of adjustable arms fixed to said shaft and carrying at the other ends thereof said grinder head and cam follower stylus, said arms being adjusted to position said grinder head and cam follower stylus in a position such that their axes are parallel and in the same radial plane with respect to said cam and work piece, said cam grinder head and cam follower stylus being spaced apart a distance exactly equal to the distance between corresponding sections of said master work cams, a second shaft, a pair of tool dressers mounted on said second shaft, and said tool dressers being aligned in the same radial plane and spaced apart a distance exactly equal to the spacing of said cam grinder head and cam follower stylus whereby said cam follower stylus and said cam grinder head may be maintained in exactly identical shape by application thereto.

References Cited in the file of this patent

UNITED STATES PATENTS

| | | |
|---|---|---|
| 1,354,453 | Neuske | Sept. 28, 1920 |
| 1,389,835 | Lecomte | Sept. 6, 1921 |
| 1,937,961 | Hutchinson | Dec. 5, 1933 |
| 2,610,447 | Bobbs | Sept. 16, 1952 |

FOREIGN PATENTS

| | | |
|---|---|---|
| 890,465 | Germany | Sept. 21, 1953 |
| 891,172 | Germany | Sept. 24, 1953 |